Jan. 8, 1957 R. B. WILLI 2,776,573
VARIABLE RECIPROCATING STROKE MECHANISM
Filed March 1, 1954

INVENTOR.
RICHARD B. WILLI
BY
*Edward W. [signature]*
ATTORNEY

United States Patent Office 2,776,573
Patented Jan. 8, 1957

2,776,573

VARIABLE RECIPROCATING STROKE MECHANISM

Richard B. Willi, Norristown, Pa., assignor to Baldwin-Lima-Hamilton Corporation, a corporation of Pennsylvania Application March 1, 1954, Serial No. 413,202

3 Claims. (Cl. 74—55)

This invention relates generally to a variable stroke reciprocating mechanism operated by a constant displacement actuating means.

There are many applications for this type of mechanism, certain examples, among others, being pump plungers, and presses in which it is desired to vary the stroke of a mechanically reciprocated die platen or an ejection plunger. Many reciprocating mechanisms having variable stroke adjustment have been proposed and used but the same have been structurally or functionally deficient so that they are relatively expensive or involve slidable actuating surfaces with consequent friction losses or have discontinuous contact between certain of the operating elements or require the mechanism to be stopped in order to adjust the stroke, as well as many other shortcomings.

It is an object of my invention to provide an improved variable stroke reciprocating mechanism that is relatively simple in construction, operation and maintenance, that permits constant contact and a uniform connection between the operating elements through all positions of stroke adjustment, and in which the stroke adjustment may be made in a relatively simple, expeditious and positive manner from a stationary position during operation of the mechanism and with a high degree of accuracy throughout a wide range of adjustments preferably between zero and maximum stroke.

Other objects and advantages will be more apparent to those skilled in the art from the following description of the accompanying drawings in which.

Figure 1:
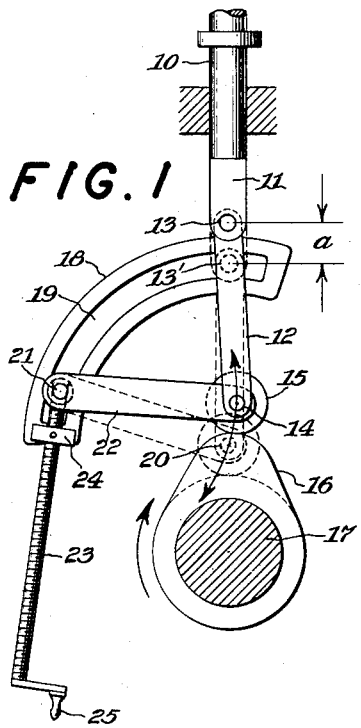
Fig. 1 is a diagrammatic illustration of a preferred form of my improved variable stroke mechanism shown in a position for maximum stroke.

In the particular embodiment of the invention which is disclosed herein merely for the purpose of illustrating one specific form among possible others that the invention might take in practice, I show in Figs. 1 to 4, inclusive, a vertically reciprocating element 10, such as, for example, the plunger of a pump, press, etc., the lower end of member 10 being forked to provide arms 11. A pair of stroke transmitting links 12, extending generally in the direction of reciprocation of element 10, have their upper ends pivotally connected at 13 to arms 11 while the lower ends of the links support, between them, a shaft 14 on which is mounted a roller or cam follower 15. A cam 16 is mounted on a camshaft 17 and engages cam follower 15.

Disposed between arms 11 and connecting links 12 is a stationary guide member 18 having a curved guide slot 19, the center of whose arc is at 20, located preferably on an extension of the axis of the reciprocating member at the lowest point of movement of the axis of follower roller 15. Slideable in this guide slot is an adjustable pivot 21 to which is connected one end of a pair of guide links 22 whose other ends are pivotally connected to shaft 14. While power means may, of course, be employed to move adjustable pivot 21 along guide slot 19 to a desired position, for purposes of illustration I show a manually rotatable threaded rod 23 connected at one end to adjustable pivot 21 by a universal joint and screw-threaded through a threaded member, such as nut 24, which is pivotally mounted on stationary guide member 18 so as to turn with the rod as the angle of the latter is changed by the repositioning of adjustable pivot 21 in the guide slot. Rod 23, rotatable by a crank handle 25, holds pivot 21 stationary at any desired point. This arrangement permits crank 25 to have a substantially stationary position during adjustments even though the cams and links are in operation.

Figure 2:
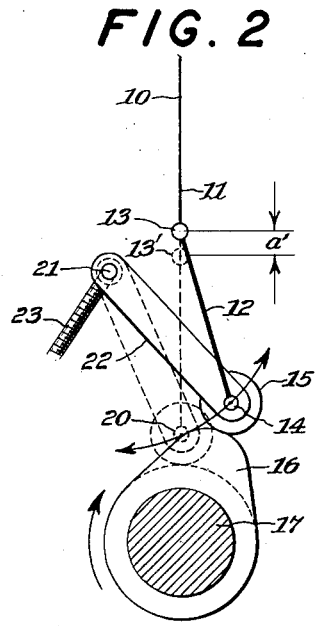
Fig. 2 is a diagrammatic view of the mechanism shown in an intermediate position of adjustment.
Figure 3:
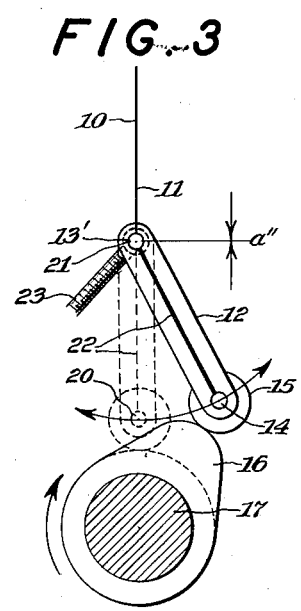
Fig. 3 is a further diagrammatic view shown in a position of zero stroke adjustment.
Figure 4:
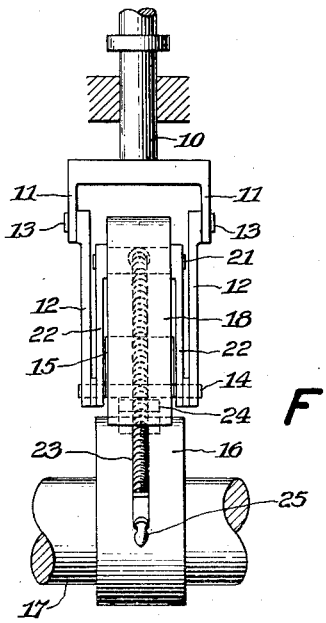
Fig. 4 is a side view of Fig. 1 from the left side thereof.

*Operation.*—Fig. 1 shows the normally stationary adjustable pivot 21 positioned well down in guide slot 19. As cam 16 is rotated in the direction of the single headed arrow, cam follower 15 and connecting links 12 oscillate laterally between the positions shown in dotted lines and those in full lines, thereby reciprocating member 10 through a stroke equal to distance $a$ which, for the sake of convenience, I show measured between two pivot positions 13 and 13'. During such movement the link 12 is laterally guided or restrained at its lower end by link 22 which oscillates in an arc about adjustable pivot 21, as indicated by the double headed arrow. This arc is substantially vertically disposed so that it imparts a maximum vertical component of movement to the vertically reciprocating member 10. As adjustable pivot 21 is adjusted upwardly in guide slot 19 by rod 23, such as to the position shown in Fig. 2, the arc through shaft 14, indicated in this figure also by a double headed arrow, leans away from the perpendicular towards the horizontal, thus imparting a smaller vertical component of movement to the reciprocating member 10 as represented by the distance $a'$. When pivot 21 continues to be moved upwardly until it becomes axially aligned with pivot 13, as shown in Fig. 3, both links 22 and links 12 also coincide so that cam 16 can no longer move them relative to each other, as was the case in Figs. 1 and 2. Hence they will move upwardly and downwardly together about a common axis which is now the axially aligned pivots 13 and 21, causing no movement whatever to reciprocating member 10, as indicated by the zero distance $a''$ in Fig. 3. The arc of shaft 14 is now almost horizontal, as shown by the double headed arrow, and while a small vertical component of movement of the free end of the links is present, yet it is ineffective because of swinging freely. Despite changes of stroke, as illustrated in Figs. 1, 2 and 3, the position to which reciprocating member 10 descends is always the same, the shortening or lengthening of the stroke taking place at the upper end thereof. Reversal of the direction of movement of adjustable pivot 21 will gradually increase the length of stroke of reciprocating member 10 from zero to maximum. Such changes in the stroke of reciprocating member 10 may be made either while such member is at rest or during full operation of the mechanism. Also, throughout operation the parts remain in constant contact with each other, it being understood, of course, that the reciprocating parts are biased downwardly by gravity or equivalent means such as a spring.

Figure 5:
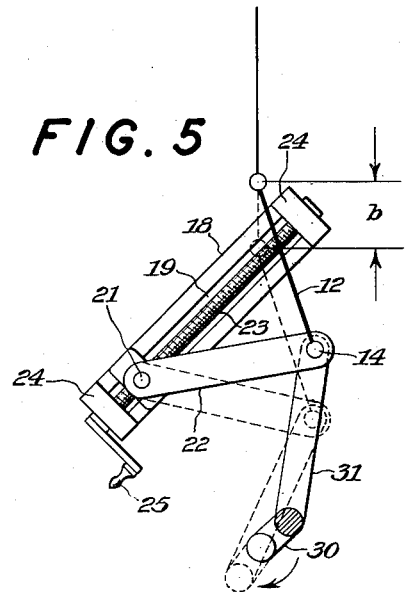
Fig. 5 is a modification of my improved mechanism wherein a crank shaft is employed as the actuating source instead of a cam.

My device may be used with equal effectiveness in many other applications, such as, for example, that shown in Fig. 5 where I provide a crankshaft 30 connected to shaft 14 by a connecting rod 31. To adjust the stroke, the pivot 21 of link 22 is guided along a straight slot 28. The various parts of Fig. 5, corresponding in function to parts of the preferred form, are given the same reference numerals. The operation of this modification is otherwise the same as the preferred form.

It will, of course, be understood that the reciprocation of the mechanism herein described may extend horizontally or in any other direction rather than vertically, as shown, and accordingly the term "vertical" reciprocation or corresponding terms for the other elements are simply terms of reference.

It is seen that I have provided an extremely simple, inexpensive and efficient variable stroke, preferably mechanically operated, reciprocating mechanism that overcomes the many deficiencies of prior devices by maintaining constant contact at all times between the parts and by eliminating sliding surfaces through which the reciprocating motion is transmitted and by providing an adjusting means that remains in a stationary position even though the mechanism is operating.

It will, of course, be understood that various changes in details of construction and arrangement of parts may be made by those skilled in the art without departing from the spirit of the invention as set forth in the appended claims.

I claim:

1. A variable stroke reciprocating mechanism comprising a vertically reciprocating element, a stroke transmitting link having its upper end pivotally connected to said element and extending generally in the direction of reciprocation thereof, actuating means also disposed generally in alignment with the direction of reciprocation of said reciprocating element for moving the lower end of the link a substantially given distance throughout all operations of the actuating means, and means pivotally connected to said lower end of said link and extending laterally therefrom so as to laterally guide the lower end of said link along an arcuate path of movement which has a vertical component for determining the length of stroke of the reciprocating element, thereby to effect reciprocation of said reciprocating element.

2. The combination set forth in claim 1 further characterized in that the lateral guiding means comprises a link, one end of which is pivotally connected to the lower end of the stroke transmitting link and the other end of which is normally a stationary pivot, and means for moving said normally stationary pivot toward the pivot at the upper end of the stroke transmitting link to reduce the extent of reciprocation and away from such pivot to increase the extent of reciprocation of said reciprocating element whereby said guide link is pivotally swung about its pivotal connection with the lower end of the stroke transmitting link thereby to vary the vertical component of the arcuate path of movement of the lower end of the stroke transmitting link to effect said variations of reciprocation.

3. The combination set forth in claim 1 further characterized in that the lateral guiding means comprises a link, one end of which is pivotally connected to the lower end of the stroke transmitting link and the other end of which is normally a stationary pivot, an arcuate guide for supporting said normally stationary pivot, and means for moving the normally stationary pivot of the guide link along said arcuate guide into substantially axial alignment with the axis of the pivotal connection at the upper end of the stroke transmitting link to the reciprocating element, whereby the stroke transmitting link and guide link then swing freely about a common pivot so that the stroke of the reciprocating element is zero.

References Cited in the file of this patent

UNITED STATES PATENTS

| | | |
|---|---|---|
| 304,971 | Strong | Sept. 9, 1884 |
| 569,299 | Day | Oct. 13, 1896 |
| 1,112,832 | Pierce | Oct. 6, 1914 |
| 1,341,312 | Glines | May 25, 1920 |
| 2,403,233 | Patch | July 2, 1946 |

FOREIGN PATENTS

| | | |
|---|---|---|
| 1,024,600 | France | Jan. 10, 1953 |